United States Patent
Gonia et al.

(10) Patent No.: US 7,801,094 B2
(45) Date of Patent: Sep. 21, 2010

(54) INTEGRATED INFRASTRUCTURE SUPPORTING MULTIPLE WIRELESS DEVICES

(75) Inventors: Patrick S. Gonia, Maplewood, MN (US); Ramakrishna S. Budampati, Maple Grove, MN (US); Yu-Gene T. Chen, Glendale, AZ (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 144 days.

(21) Appl. No.: 11/161,565

(22) Filed: Aug. 8, 2005

(65) Prior Publication Data

US 2007/0030832 A1 Feb. 8, 2007

(51) Int. Cl.
*H04Q 7/24* (2006.01)
(52) U.S. Cl. .................. 370/338; 370/334; 370/337; 370/401; 455/408; 455/456.1; 455/456.2
(58) Field of Classification Search ................. 370/338, 370/337, 334, 401, 331, 328; 455/408, 456.1, 455/456.2, 456.5, 456.6, 552.1, 553.1
See application file for complete search history.

(56) References Cited

U.S. PATENT DOCUMENTS

| | | | |
|---|---|---|---|
| 3,643,183 A | 2/1972 | Geffe | |
| 3,715,693 A | 2/1973 | Fletcher et al. | |
| 3,758,885 A | 9/1973 | Voorman et al. | |
| 4,264,874 A | 4/1981 | Young | |
| 4,529,947 A | 7/1985 | Biard et al. | |
| 4,614,945 A | 9/1986 | Brunius et al. | |
| 4,812,785 A | 3/1989 | Pauker | |
| 4,843,638 A | 6/1989 | Walters | |
| 5,392,003 A | 2/1995 | Nag et al. | |
| 5,428,602 A | 6/1995 | Kemppainen | |
| 5,428,637 A | 6/1995 | Oliva, Jr. et al. | |
| 5,430,409 A | 7/1995 | Buck et al. | |
| 5,438,329 A | 8/1995 | Gastouniotis et al. | |
| 5,451,898 A | 9/1995 | Johnson | |
| 5,481,259 A | 1/1996 | Bane | |
| 5,642,071 A | 6/1997 | Sevenhans et al. | |
| 5,659,303 A | 8/1997 | Adair, Jr. | |

(Continued)

FOREIGN PATENT DOCUMENTS

CH          673184          2/1990

(Continued)

OTHER PUBLICATIONS

"Medium Access Control (MAC) and Physical (PHY) Specifications," ANSI/IEEE Std 802.11, pp. 177-179, 1999.

(Continued)

*Primary Examiner*—Tuan A Pham
(74) *Attorney, Agent, or Firm*—Crompton Seager & Tufte LLC (57) ABSTRACT

Methods and devices for operating a wireless network including redundant communication. Methods involving redundantly connected nodes are discussed including addressing methods and/or methods of creating groups for such redundant communication. The use of primary and secondary redundant connections is discussed. The inclusion of a redundant network in association with a non-redundant network such as a Zigbee® protocol network is discussed. Also, devices for implementing such methods are described.

19 Claims, 8 Drawing Sheets

U.S. PATENT DOCUMENTS

| | | | |
|---|---|---|---|
| 5,726,603 | A | 3/1998 | Chawla et al. |
| 5,767,664 | A | 6/1998 | Price |
| 5,809,013 | A | 9/1998 | Kackman |
| 5,847,623 | A | 12/1998 | Hadjichristos |
| 5,930,257 | A * | 7/1999 | Smith et al. ............... 370/401 |
| 5,963,650 | A | 10/1999 | Simionescu et al. |
| 6,052,600 | A | 4/2000 | Fette et al. |
| 6,058,137 | A | 5/2000 | Partyka |
| 6,091,715 | A | 7/2000 | Vucetic et al. |
| 6,175,860 | B1 | 1/2001 | Gaucher |
| 6,353,846 | B1 | 3/2002 | Fleeson |
| 6,366,622 | B1 | 4/2002 | Brown et al. |
| 6,414,963 | B1 | 7/2002 | Gemar |
| 6,624,750 | B1 | 9/2003 | Marman et al. |
| 6,768,901 | B1 | 7/2004 | Osborn et al. |
| 6,785,255 | B2 | 8/2004 | Sastri et al. |
| 6,823,181 | B1 | 11/2004 | Kohno et al. |
| 6,836,506 | B2 | 12/2004 | Anderson |
| 6,901,066 | B1 | 5/2005 | Helgeson |
| 7,020,501 | B1 * | 3/2006 | Elliott et al. ............... 455/574 |
| 7,120,161 | B1 * | 10/2006 | Gadarowski et al. ......... 370/419 |
| 2002/0011923 | A1 | 1/2002 | Cunningham et al. |
| 2002/0085622 | A1 | 7/2002 | Dhar et al. |
| 2002/0141479 | A1 | 10/2002 | Garcia-Luna-Aceves et al. |
| 2003/0053555 | A1 | 3/2003 | McCorkle et al. |
| 2003/0156557 | A1 * | 8/2003 | Kalden et al. ............... 370/329 |
| 2003/0198280 | A1 | 10/2003 | Wang et al. |
| 2004/0170181 | A1 * | 9/2004 | Bogdon et al. ............... 370/400 |
| 2004/0253996 | A1 | 12/2004 | Chen et al. |
| 2005/0048977 | A1 * | 3/2005 | Dorenbosch et al. ......... 455/441 |
| 2005/0198257 | A1 * | 9/2005 | Gupta et al. ............... 709/224 |
| 2005/0238046 | A1 * | 10/2005 | Hassan et al. ............... 370/465 |
| 2005/0249227 | A1 * | 11/2005 | Wang et al. ............... 370/412 |
| 2005/0281215 | A1 | 12/2005 | Budampati et al. |
| 2006/0045056 | A1 * | 3/2006 | O'Hara, Jr. ............... 370/338 |
| 2006/0099948 | A1 * | 5/2006 | Hoghooghi et al. ......... 455/436 |
| 2006/0133414 | A1 * | 6/2006 | Luoma et al. ............... 370/466 |
| 2006/0221916 | A1 * | 10/2006 | Taylor et al. ............... 370/338 |
| 2007/0004336 | A1 * | 1/2007 | Aloni-Lavi et al. ......... 455/63.1 |
| 2007/0025246 | A1 * | 2/2007 | Pirzada et al. ............... 370/230 |
| 2008/0037476 | A1 * | 2/2008 | Del Prado Pavon et al. . 370/337 |
| 2008/0049619 | A1 * | 2/2008 | Twiss ......................... 370/236 |

FOREIGN PATENT DOCUMENTS

| | | |
|---|---|---|
| DE | 4344172 | 6/1995 |
| EP | 0607562 | 7/1994 |
| EP | 0893931 | 1/1999 |
| EP | 1480388 | 11/2004 |
| WO | WO 00/70572 | 11/2000 |
| WO | WO 02/052798 A2 * | 7/2002 |

OTHER PUBLICATIONS

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Circuits, vol. 32, No. 5, pp. 722-729, May 1997.

Cheng et al., "TPS: A Time-Based Positioning Scheme for Outdoor Wireless Sensor Networks," IEEE INFOCOM 2004, 12 pages, 2004.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

http://wiki.personaltelco.net/index.cgi/PhasedArray?action=print, "Phased Array—Personal Telco Wiki," 3 pages, May 2, 2005.

http://www.bambooweb.com/articles/o/s/OSI_model.html, "Bambooweb OSI model," Bambooweb Dictionary, 5 pages, printed May 23, 2005.

http://www.dailywireless.org/modules.php?name=News &file=article&sid=871, "Location by Triangulation—Not," Daily Wireless, 2 pages, printed May 2, 2005.

http://www.unstrung.com/document.asp?site=unstrung &doc_id15069&page_number=1, 11 pages, printed May 2, 2005.

http://www.zigbee.org/en/about/faq.asp, "Wireless Control That Simply Works," ZigBee Alliance, 8 pages, printed Feb. 2, 2005.

Jung et al., "Improving IEEE 802.11 Power Saving Mechanism," 6 pages, Jul. 7, 2004.

Kinney, "ZigBee Technology: Wireless Control That Simply Works," 20 pages, Oct. 2, 2003.

Lee, "The Design of CMOS Radio-Frequency Integrated Circuits," Cambridge University Press, 42 pages, 1998.

Milstein, "Wideband Code Division Multiple Access," IEEE Journal on Selected Areas in Communications, vol. 18, No. 8, pp. 1344-1354, Aug. 2000.

Moulding et al., "Gyrator Video Filter IC with Automatic Tuning," IEEE Journal of Solid-State Circuits, vol. SC15, No. 6, Dec. 1980, pp. 963-968.

Nasipuri et al., "A Directionality Based Location Discovery Scheme for Wireless Sensor Networks," pp. 105-111, prior to Jun. 17, 2005.

Razavi, "Design Considerations for Direct-Conversion Receivers," IEEE Transactions on Circuits and Systems—II: Analog and Digital Signal Processing, vol. 44, No. 6, pp. 428-435, Jun. 1997.

Rofougaran et al., "A 1 GHz CMOS RF Front-End IC for a Direct-Conversion Wireless Receiver," IEEE Journal of Solid-State Circuits, vol. 31, pp. 880-889, Jul. 1996.

Rofougaran et al., "A 900 MHz CMOS RF Power Amplifier with Programmable Output Power," Proceedings VLSI Circuits Symposium, Honolulu, 4 pages, Jun. 1994.

Savvides et al., "Dynamic Fine-Grained Localization in Ad-Hoc Networks of Sensors," pp. 166-179, prior to Jun. 17, 2005.

Want et al. "The Active Badge Location System," 7 pages, prior to Jun. 17, 2005.

Wilson et al., "A Single-Chip VHF and UHF Receiver for Radio Paging", IEEE Journal of Solid State Circuits, vol. 26, No. 12, 9 pp. 1944-1950, Dec. 1991.

Chiang et al., "A Partition Network Model for Ad Hoc Networks," IEEE, 6 pages, 2005.

Jin et al., "A Hierarchical Routing Protocol for Large Scale Ad Hoc Network," IEEE, 7 pages, 1999.

* cited by examiner

INTEGRATED INFRASTRUCTURE SUPPORTING MULTIPLE WIRELESS DEVICES

FIELD

The present invention is related to the field of wireless networks. More specifically, the present invention relates to methods of integrating multiple wireless networks together including wireless networks that are connected to a wired network.

BACKGROUND

Figure 1:
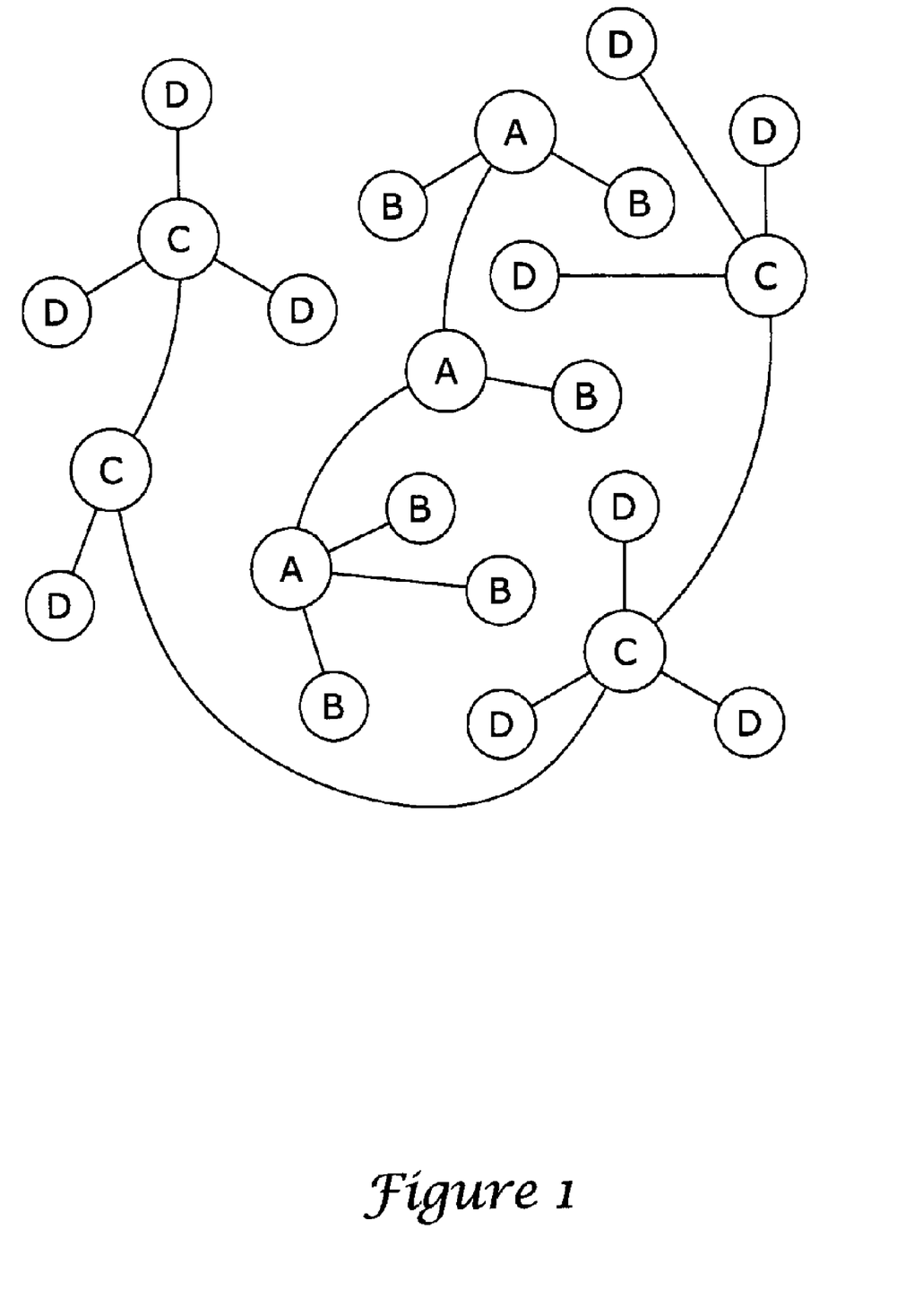
FIG. 1 illustrates a multi-network environment.

Wireless communication systems are coming into wide use for routing information from one or more locations to a destination. In some environments, multiple wireless systems may be used simultaneously. FIG. 1 illustrates a first network having devices A and B, and a second network having devices C and D, operating in the same general vicinity. Some nodes A and C operate as infrastructure nodes and/or access points for each system. The infrastructure nodes may provide single hop communication (node-to-node) as well as multi-hop communication (communication directed to the base/destination node via other infrastructure nodes). The two networks are shown as being completely separate and non-cooperative. The configuration shown is spatially inefficient, as there are more "infrastructure" nodes than necessary given the space covered by the two systems. Further, when configuring communications within each network, the existence of the other network tends to create noise difficulties and further inefficiencies.

New and reliable configurations for such systems are needed.

SUMMARY

The present invention in several illustrative embodiments provides methods and devices for operating wireless networks in environments where multiple systems are in use. In an illustrative embodiment, an infrastructure node for wireless communication is configured to determine whether a communication it receives should be routed using a first network or a second network. The infrastructure node then routes data from the received communication appropriately. The infrastructure node may first determine whether the communication is a communication that the infrastructure node should handle.

In another illustrative embodiment, a method of operating a wireless device includes determining which of a first and a second communication networks a received communication belongs to. The method may include first determining whether the communication is one which the wireless device should handle.

In yet another illustrative embodiment, two networks, such as a mobile worker network and a sensor network, may operate in proximity to one another. An infrastructure node for use with both networks may include first and second communication devices, for example antennae, with one communication device adapted for communication with the mobile worker network and the other adapted for communication with the sensor network. In some such embodiments, one or more of the communication devices may be directional antennae.

DETAILED DESCRIPTION

The following detailed description should be read with reference to the drawings. The drawings, which are not necessarily to scale, depict illustrative embodiments and are not intended to limit the scope of the invention.

Figure 2:
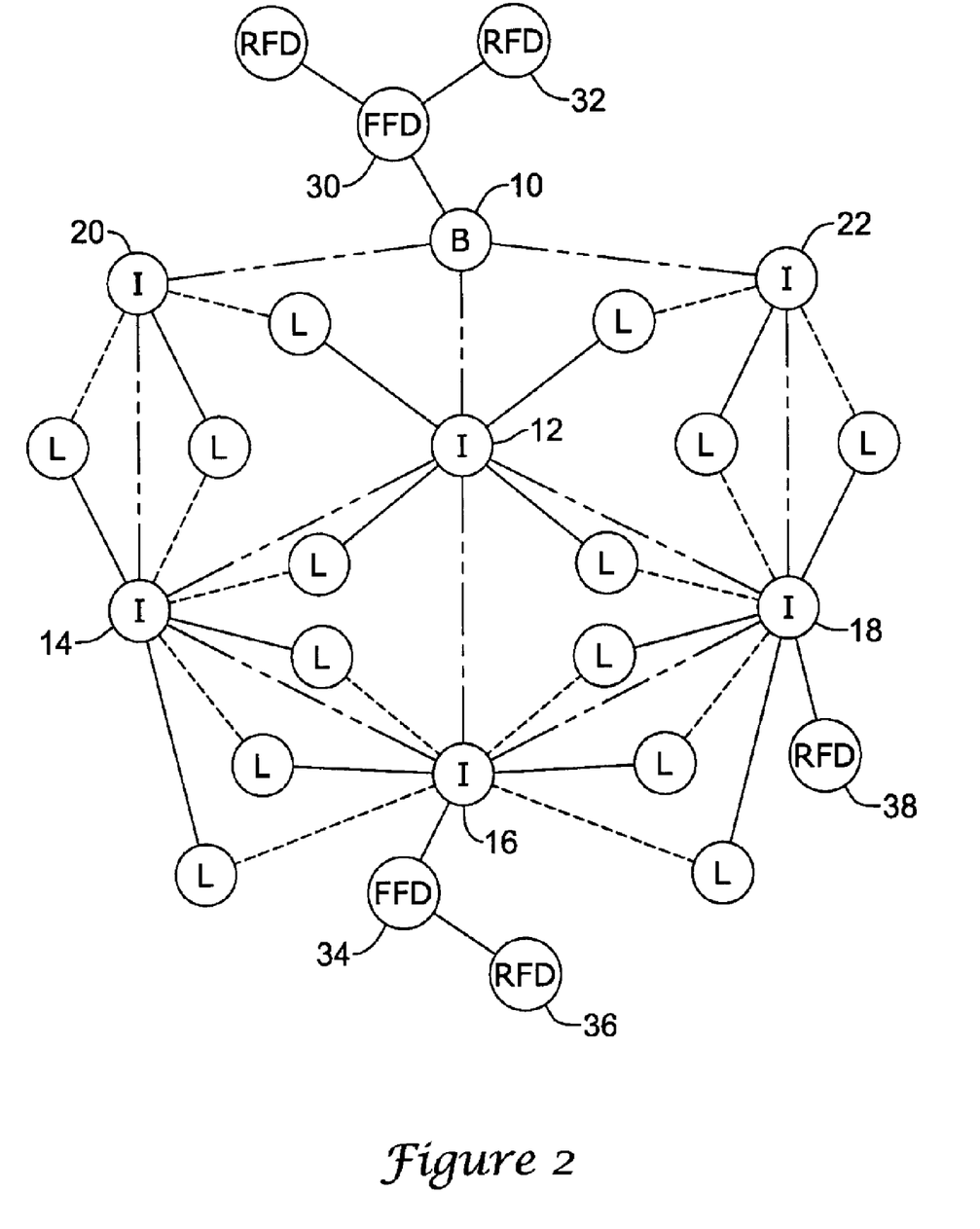
FIG. 2 illustrates an example wireless network having a base station, several infrastructure nodes, and several leaf nodes.

FIG. 2 illustrates an example wireless network. Most, if not all, of the communicative couplings shown in FIG. 2 are intended to indicate wireless communication. The network includes a base node 10 that is communicatively coupled to a number of infrastructure nodes (I-nodes, each indicated with an I). Some I-nodes 12, 20, 22 communicate directly with the base node 10, while other I-nodes 14, 16, 18 send data through hops to reach base node 10. The I-nodes may also be communicatively coupled to a number of leaf nodes (L-nodes, each indicated with an L).

With respect to the illustrative base node 10, the base node may be given various descriptive terms used in the art (for example, gateway, access point, etc.). For purposes herein, the base node 10 may be considered as a destination node for one or more networks, where a destination node serves as the destination for data transmitted within a network. The base node may also be connected to and communicating on a wired network; such a base node may be referred to as a gateway or access point.

Certain methods and examples for operating a redundant system having the I-nodes and L-nodes of FIG. 1 are shown and described in copending U.S. patent application Ser. No. 10/870,295, entitled WIRELESS COMMUNICATION SYSTEM WITH CHANNEL HOPPING AND REDUNDANT CONNECTIVITY, filed Jun. 17, 2004, published as U.S. Pat. App. Pub. No. 2005-0281215 A1, and copending U.S. patent application Ser. No. 10/905,971, entitled WIRELESS ROUTING SYSTEMS AND METHODS, filed Jan. 28, 2005, published as U.S. Pat. App. Pub. No. 2006-0171346 A1, the disclosures of which are incorporated herein by reference. For example, in some embodiments discussed in these patent applications, first and second non-overlapping redundant paths may be defined from the leaf nodes L to the base node 10. Other networks, for example, networks under the Zigbee® protocol or otherwise in accordance with IEEE® 802.15.4, do not call for redundant connectivity.

As noted above, the collection of I-nodes and L-nodes may be configured for redundant connectivity of the L-nodes. However, as further shown in FIG. 1, there may be additional devices that are neither I-nodes nor L-nodes. The illustrated system provides for interconnectivity of more than one type of network. More specifically, devices using the Zigbee® protocol terminology are shown. These include an FFD 30 directly communicating with the base node 10. FFD 30 is shown also communicating with an RFD 32. Additionally, an FFD 34 communicates with I-node 16 as well as RFD 36. Finally, an RFD 38 is shown communicatively coupled to I-node 18.

If one of the networks shown in FIG. 2 is a sensor network, for example, some or all of the L-nodes or RFDs may be battery powered devices, sometimes referred to as energy constrained devices (ECD). An ECD may have multiple modes including a low power sleep mode and an awake mode. While asleep, an ECD is out of communication with the rest of the network. While awake, an ECD is capable of transmitting messages. In some examples, an ECD can also receive messages from other wireless devices.

Another set of terminology may consider the leaf nodes as examples of data sending nodes, while the infrastructure nodes are data relaying nodes. Likewise, an RFD may be a data sending node and an FFD may be a data relaying node. The terminology may be used to indicate that data sending nodes are nodes in which data originates, though the data sending nodes may not perform the task of receiving and retransmitting data addressed to other devices. Data relaying nodes may receive and retransmit data while also originating data when desired. The data sending nodes may also receive data that is addressed to them, including, for example, acknowledgements, addressing or scheduling information, etc.

In some embodiments, the data sending nodes may be nodes which provide access to a network from another network. For example, a data sending node may receive data gathered in a different network and send data in a network as shown in FIG. 2. This may be useful, for example, when a wireless system is retrofitted to an existing facility having an older, local sensor network, with a data sending node used to move data from the old network onto a new network.

One aspect of the system as shown in FIG. 2 is the provision of more than one network within the same network system. For example, I-node 18 receives communications from I-nodes 12, 16, 22, several L-nodes, and an RFD 38. As such, I-node 18 is configured to receive, identify, filter, and/or handle various communications from each of these sources. Communications coming from the L-nodes may be treated differently from the communications coming from the RFD 38 and/or other I-nodes 12, 16, 22. Further, if communication from FFD 34 is routed from I-node 16 to I-node 18, this communication may also be treated differently from other messages received from I-node 16 by I-node 18.

The I-nodes 12, 16, 22 that combine functionality for the two networks may reduce the number of devices needed to provide infrastructure for the overall system. The I-nodes 12, 16, 22 may use mobile worker type networking (such as Bluetooth®, IEEE® 802.11 (b), or IEEE® 802.11 (g)) as well as other device networking (such as Honeywell®'s XYR5000 systems, 802.15.2, or the redundant networking shown in U.S. patent application Ser. No. 10/870,295). The I-nodes 12, 16, 22 and/or the overall system may include smart-channel allocation to aid in the non-interfering coexistence of the two systems. For example, the I-nodes 12, 16, 22 may allow a mobile worker network operating using IEEE® 802.11 (g) to operate on non-overlapping channels 1 and 6 (as defined for the IEEE® 802.11 (g) protocol), while allowing a separate network, such as an industrial wireless sensor network, to operate on non-overlapping channel 11, without interference.

In some embodiments, the I-nodes 12, 16, 22 may include separate radio hardware for each of several systems. In some embodiments, the I-nodes 12, 16, 22 may include multiple transceivers. In another illustrative embodiment, one or more of the I-nodes 12, 16, 22 may include one or more software defined radios, allowing the I-nodes 12, 16, 22 to readily adapt to different networks using the same hardware.

Figure 3A:
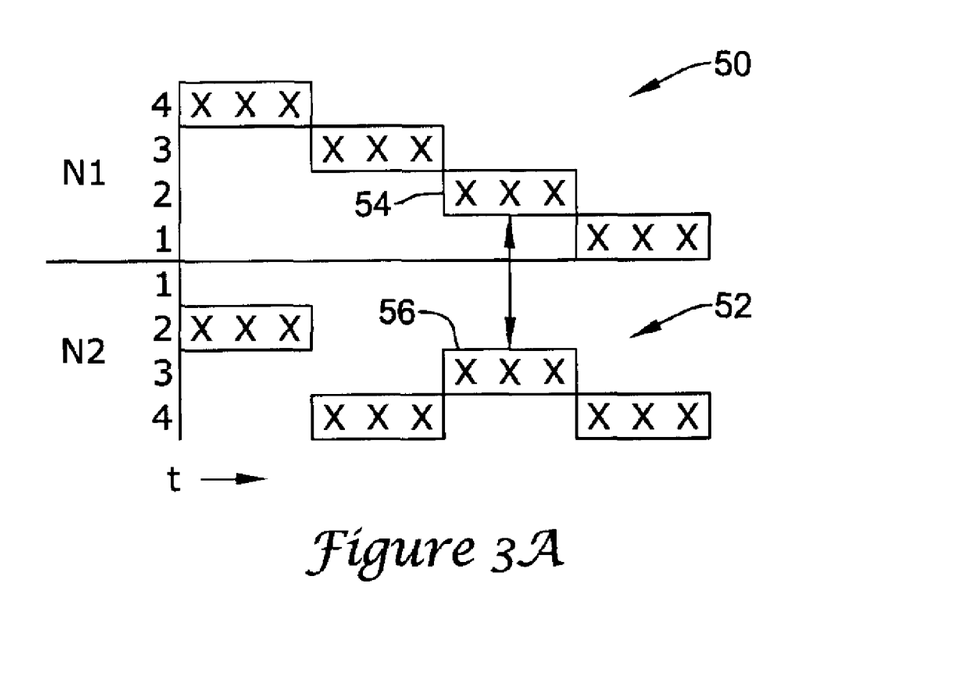
FIGS. 3A-3B illustrate data channel timelines showing separate (FIG. 3A) and integrated (FIG. 3B) networking use of data channels.
Figure 3B:
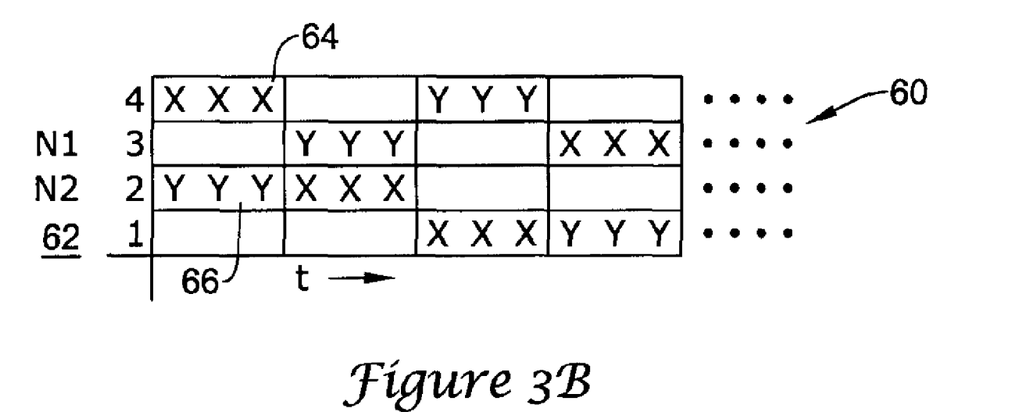

FIGS. 3A-3B illustrate data channel timelines showing separate (FIG. 3A) and integrated (FIG. 3B) networking use of data channels. Referring to FIG. 3A, a first timeline 50 is shown for a first network N1. For illustrative purposes, only four channels are used. It should be understood that in a real world environment there may be any number of channels, depending upon the actual devices and regional regulations. A second timeline 52 indicates channel usage by a second network N2. As shown in the two timelines 50, 52, the networks use different channels at different times. A channel-hopping sequence may be used, for example. Because there are a limited number of channels available, eventually, as shown at 54 and 56, both networks N1, N2 may attempt to use the same channel at the same time, resulting in interference between the networks and, likely, causing delays in data movement and/or lost data. Further, the two networks may not be time coordinated. For example, one network may define longer frequency hops than the other, and/or the beginning/end of the frequency hops for each network may not line up, decreasing channel availability even more.

Referring now to FIG. 3B, if the two networks can be coordinated or integrated together, for example, using certain embodiments of the present invention, the use of channels by the networks N1 and N2 can be coordinated to avoid interference. In the timeline 60, first blocks 64 indicate channel usage by one network, N1, and second blocks 66 indicate channel usage by the other network N2. Frequency hops can be coordinated because control over the networks N1, N2 may come from one device or a small number of devices that participate in each network. Alternatively, control may be such that one network (for example, N1) is subservient to the other network (N2) and its frequency hop sequence or channel allocation may be defined in response to the dominant network.

FIG. 3B shows the two networks using overlapping channels in a non-overlapping schedule. In other embodiments, channels may be entirely allocated to one network. For example, if there are four channels (1, 2, 3, 4) available, channels 1 and 2 may be allocated to network N1, and channel 3 may be allocated to network N2, with channel 4 reserved for system level communication or future use. Decisions regarding channel allocation may be made in a suitable fashion, for example, online during operation, at initial deployment, or manually. The I-nodes in a network may collectively determine allocation, or a central channel allocation device may be used for this purpose either during operation or at initialization. In yet another embodiment, a configuration tool may be used to provide channel scheduling or allocation, or both. An illustrative configuration tool may be, for example, that of U.S. patent application Ser. No. 11/160,314, entitled WIRELESS APPLICATION INSTALLATION, CONFIGURATION AND MANAGEMENT TOOL, published as U.S. Pat. Pub. No. 2006-0287001 A1, the disclosure of which is incorporated herein by reference.

Figure 4:
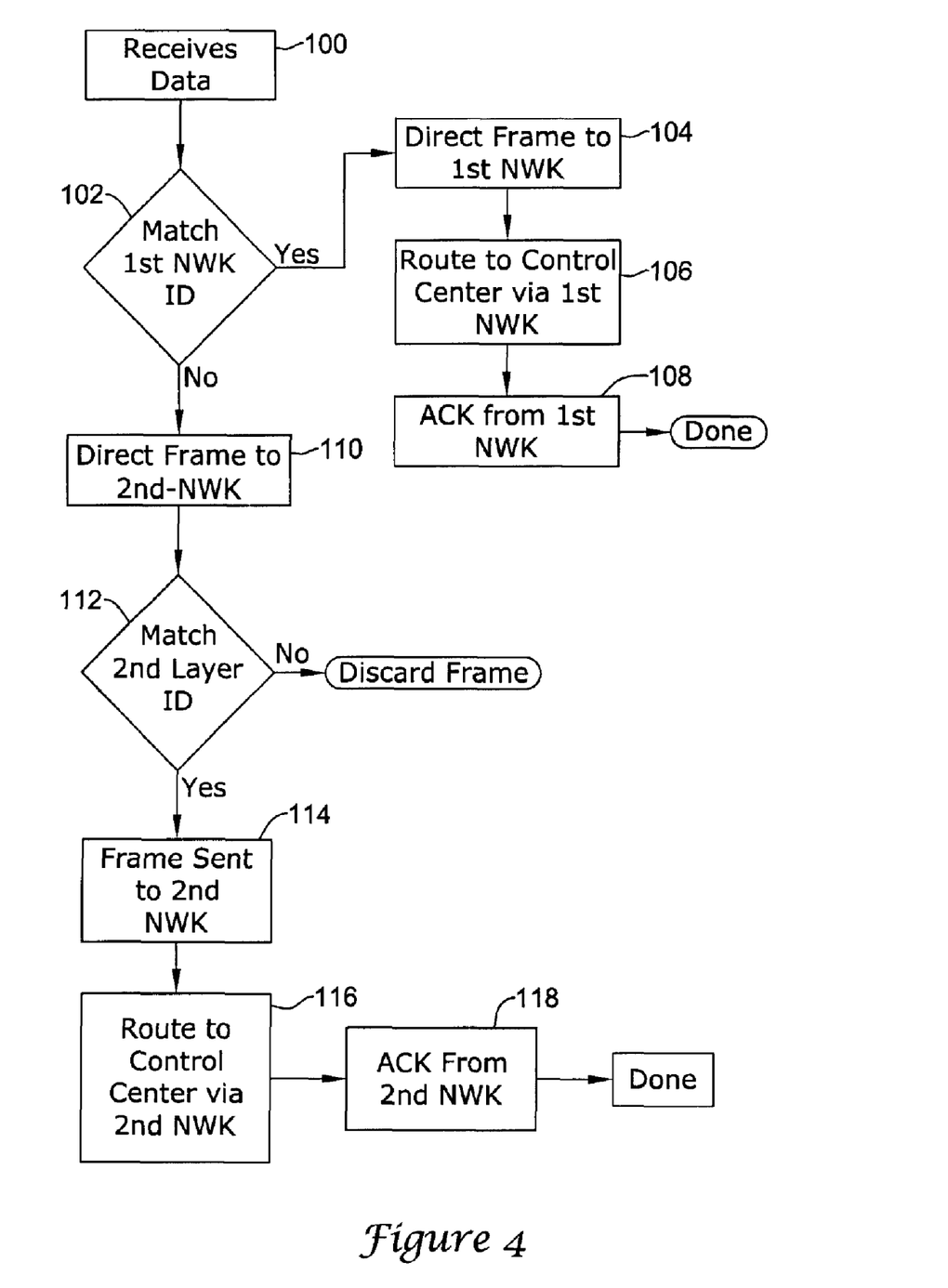
FIG. 4 illustrates an infrastructure node operation for receiving and retransmitting data.

FIG. 4 shows illustrative node operation for receiving and retransmitting data. First, the infrastructure node receives data, as shown at 100, which may include basic data checking methods such as parity checking. Next, it is determined whether the address of the data matches the medium access control (MAC) identifier, as shown at 102. This MAC identifier is used for the first network. If query 102 yields a YES, the frame is directed to the first network, as noted at 104, and routed to a control center, destination or base node via the first network, as shown at 106. An ACK may be generated in a form suitable for the first network, as shown at 108.

If step 102 yields a NO, the frame is directed to determinations relative a second network, as shown at 110. Next, it is determined whether the address of the data matches the second network ID, as shown at 112. If not, the frame is discarded. Otherwise, the frame is sent to the second network, as shown at 114, and routed to a control center, destination or base node for the second network, as indicated at 116. An acknowledgement may be sent to the sending node from the second network, as shown at 118.

For the illustrative example shown in FIG. 4, the first network may be a mobile worker network, a Zigbee® protocol layer, a wired network, or any other suitable communication layer. The second network may use a different communications protocol than the first network, if desired. For example, if the first network is configured for a Zigbee® protocol, the second network may use, for example, a redundant network method such as one of the methods set out in copending U.S. patent application Ser. No. 10/870,295, which is incorporated herein by reference.

Figure 5A:
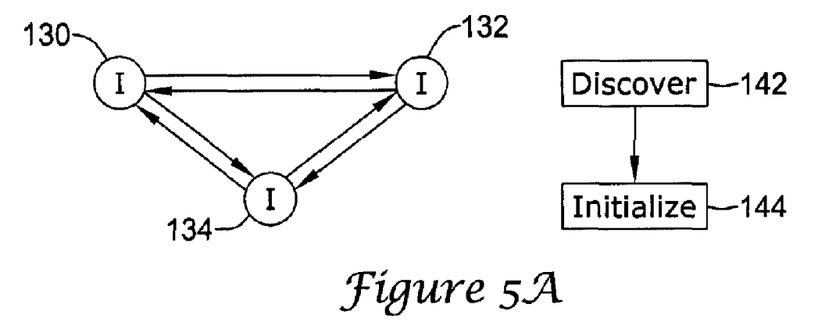
FIGS. 5A-5C illustrate the use of integrating wireless devices to build a system adapted for multi-network operation.
Figure 5B:
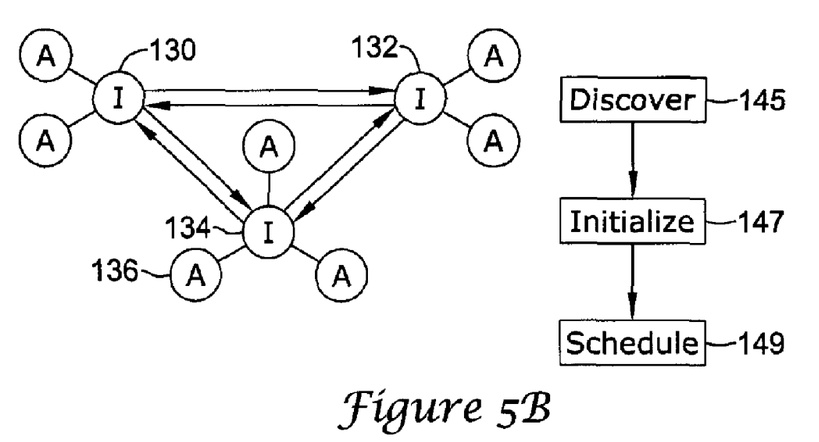
Figure 5C:
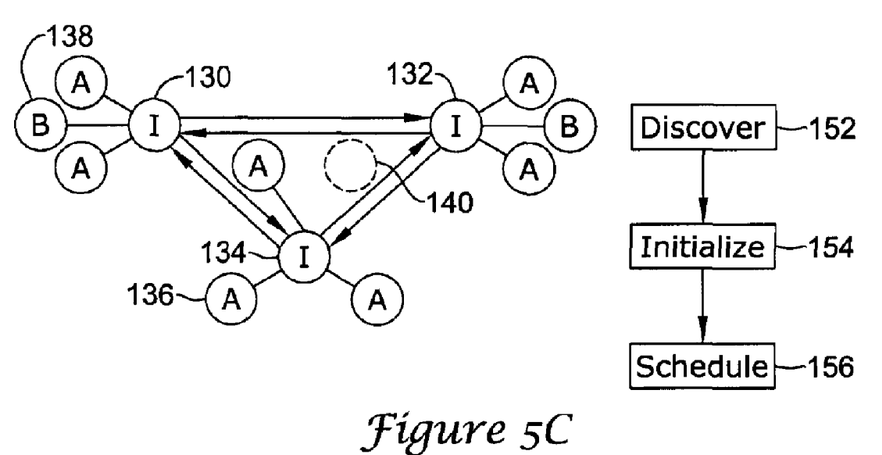

FIGS. 5A-5C illustrate the use of integrating wireless devices to build a system adapted for multi-network operation. The infrastructure for the illustrative network is shown in FIG. 5A. Three infrastructure nodes 130, 132, 134 are shown. In the illustrative embodiment, there is two-way communication between the illustrative infrastructure nodes 130, 132, 134, and one or more of the infrastructure nodes 130, 132, 134 may serve as an access point, gateway, or destination node for one or more networks. The infrastructure nodes 130, 132, 134 may engage in a sequence including discovery 142 and initialization 144 to set up communications with one another. In some embodiments, one or more of the infrastructure nodes 130, 132, 134 may be given authority to allocate communication channels and times for use in the system. In other embodiments, a specific controller device may be used, separate from the system, to perform such configuration steps. In yet other embodiments, a decentralized system may allow multiple infrastructure nodes 130, 132, 134 to perform allocation and scheduling tasks.

FIG. 5B is the same as FIG. 5A except that a first network that has devices A is also shown. A sequence of discovery 145, initialization 147, and, optionally, scheduling 149 may be performed. During discovery, one or more of the wireless devices in the system may send out discovery beacons to determine what other devices are in communication proximity. Discovery may occur through any suitable method, but when completed will often (though not necessarily) result in at least some system devices having data relating to the other devices in the system. For example, an I-node 134 may have data related to one of the devices A 136, or the device A 136 may have data related to the I-node 134, or both. Discovery 145 may occur at intervals, continuously, at random, or as needed.

After discovery 145, initialization may occur. During initialization 147, the various devices in the system may become "associated" with one another for the purposes of communication. The word "associated" is used herein in its general sense and is not limited to a definition such as that of the Zigbee® protocol. This selection of communication routes may occur using decentralized or centralized methods. Next, communications within the system may be scheduled, as shown at 149. The schedule may allocate certain times/channels of communication for certain purposes, depending upon the application. Not all communications in a system need to be scheduled, but some may be. For example, with an emergency sensor network, a schedule may be used to call for periodic communications to determine that individual sensors are still operational and/or to collect data from the sensors. When an emergency occurs (for example, a fire alarm is set off), an unscheduled communication may take place.

Referring now to FIG. 5C, a number of devices B are now shown, for example, device B at 138. This second network having device B may also be subject to the steps of discovery 152, initialization 154 and scheduling 156. Discovery 152 and initialization 154 may be similar to discovery 145 discussed above. In some embodiments, discovery 152 and initialization 154 are performed instead of discovery 145 and initialization 147, while in other embodiments, separate discovery and initialization steps may be performed, one for each network. In another embodiment, rather than going through steps 145-147-149 and then steps 152-154-156, the steps may be integrated such that all of the discovery and/or initialization are performed prior to scheduling. In some cases, this may allow more efficient or optimized allocation of system resources.

In an illustrative embodiment, the devices A make up a deployed industrial wireless sensor network, while the devices B are mobile workers and may use IEEE® 802.11 (b) or other suitable mobile protocols. In one such embodiment, the industrial wireless sensor network devices (devices A) have generally fixed or predictable locations (a sensor on an elevator, for example, has a non-fixed but predictable location). Thus, discovery is relatively simple for these devices, and initialization is not needed except in occasional circumstances, for example, when a new device is added or one of the devices A goes offline for whatever reason.

However, maintenance of working communications connections with the mobile workers (devices B) may be more difficult because of their transient nature. For example, if device B at 138 is mobile, it may be initially associated with I-node 130 because it has the best communication connection thereto (best received signal strength or other indicator, for example). However, if device B at 138 moves to location 140, it may be closer to I-node 152 and may have a better communication connection thereto. As the device B shown at 138 moves, however, the optimal scheduling and/or mapping of communications with device B 138 may change.

In some embodiments a hybrid communications mapping/configuration method is used, combining both centralized and decentralized mapping. For example, in some embodiments, scheduling and mapping for fixed devices may be performed using a centralized mapping methodology, which may be updated periodically, or as needed. In the same embodiment, mapping for mobile devices may be performed using decentralized methods, which may be almost continuously updated. Several concepts relating to centralized and decentralized communication mapping and scheduling are discussed in copending U.S. patent application Ser. No. 10/905,971, entitled WIRELESS ROUTING SYSTEMS AND METHODS, published as U.S. Pat. App. Pub. No. 2006-0171346 A1, the disclosure of which is incorporated herein by reference.

In some embodiments, a first network makes use of scheduled communications while a second network makes use of transmitter initiated communications.

Figure 6A:
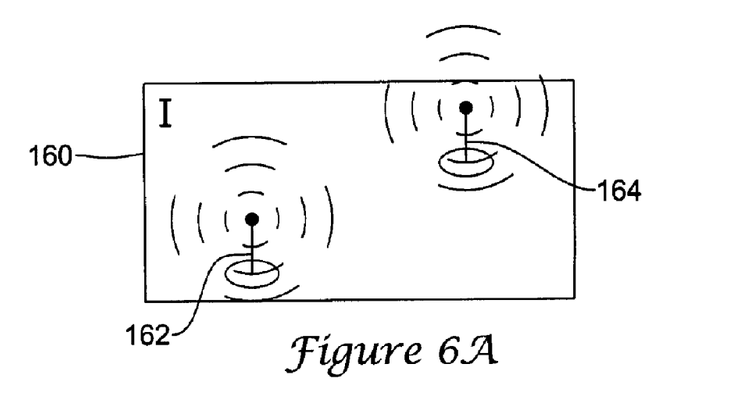
FIG. 6A shows an illustrative infrastructure node for integrating networks.
Figure 6B:
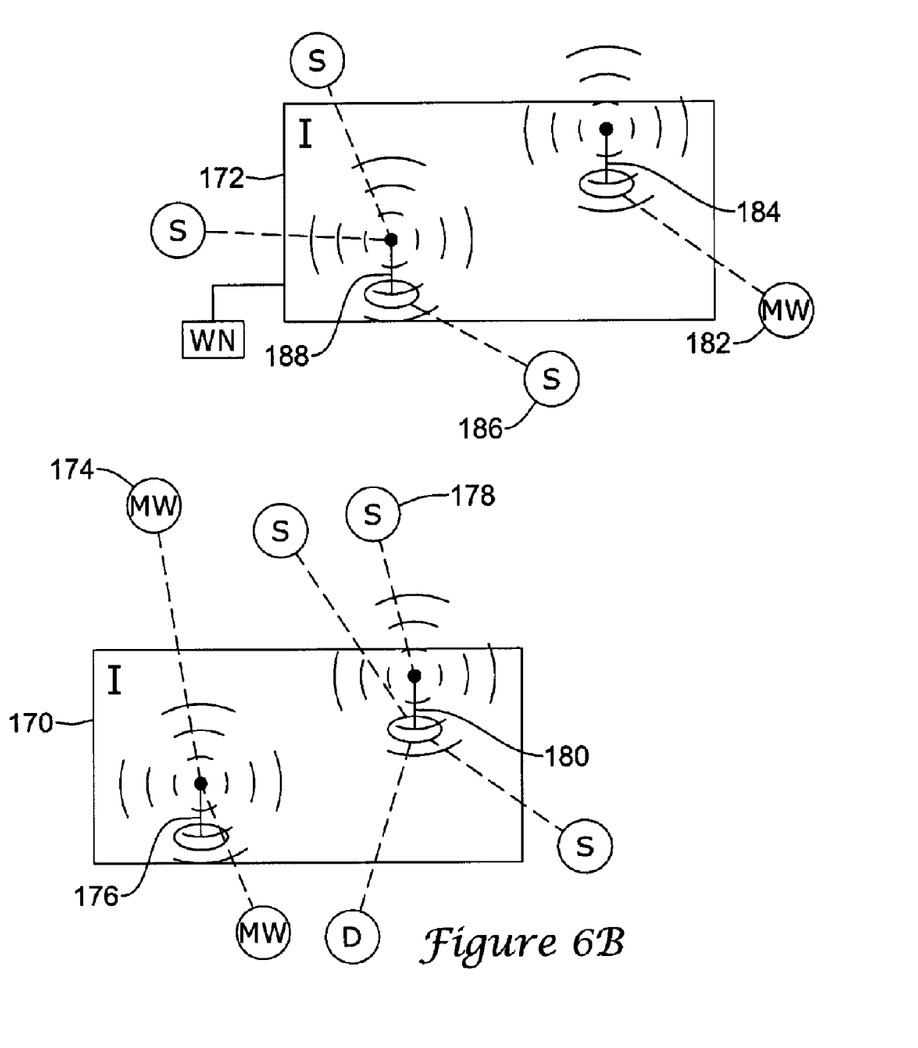
FIG. 6B shows an illustrative integrated network environment.
Figure 7:
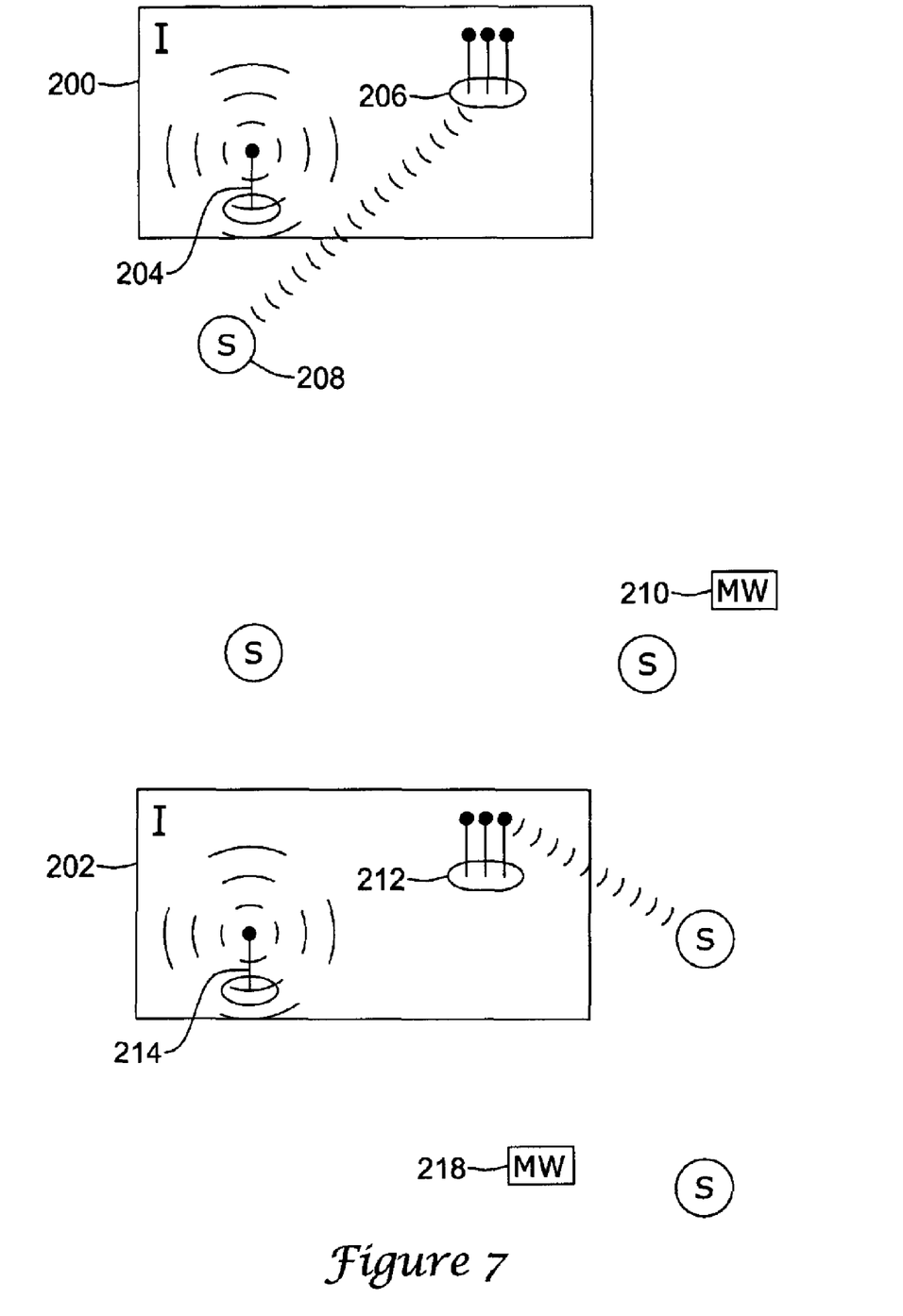
FIG. 7 shows another illustrative integrated network environment.

It should be noted that, in some embodiments, single-transceiver infrastructure nodes may be used. In other embodiments, a multi-transceiver infrastructure node may be used, as shown in FIGS. 6A, 6B and 7. FIG. 6A shows an illustrative infrastructure node for integrating networks. The infrastructure node 160 is shown in the illustrative embodiment as including both a first communication antenna 162 and a second communication antenna 164. The antennae 162, 164 are coupled to first and second transceivers, which may be physically embodied in any suitable form. In some embodiments, one or both transceiver/antenna pairs are adapted for specific applications. In some embodiments, one or both transceiver/antenna pairs take the form of software defined radios.

In some embodiments, the antennae 162, 164 and corresponding transceivers may each be adapted to receive or transmit on distinct frequencies. For example, antenna 162 may be tuned to frequency F1 and antenna 164 may be tuned to frequency F2 at a given time. By knowing associated network communications protocols, it may be determined that a message received on F1 by antenna 162 was generated by a first network, most likely, while a message received on F2 by antenna 164 likely comes from a second network. The data content (addressing, FCS, etc.) of each message may be further used to determine whether each message is from a device in one or the other network.

FIG. 6B shows an illustrative integrated network environment. The network shown in FIG. 6B includes a first infrastructure node 170 and a second infrastructure node 172. A mobile worker is shown at 174, and communicates wirelessly with the first infrastructure node by communication with a first antenna 176. An additional mobile worker is also shown in communication with the first antenna 176 on the first infrastructure node 170. Any of a number of methods, for example, code or time division, may be used to allow communication with each of the mobile workers using the first antenna 176. A number of sensors, including sensor 178, are also shown in communication with a second antenna 180 on the first infrastructure node 180.

The second infrastructure node 172 communicates with a mobile worker 182 using a first antenna 184, and with a sensor 186 via a second antenna 188. The second infrastructure node 172 may be a base node or destination node as well, as it is shown connected to wired network WN. In an illustrative embodiment, the plural transceivers allow each infrastructure node 170, 172 to use more than one channel for communication at any given time. In addition to simply increasing communication capacity, the inclusion of multiple transceivers on each infrastructure node 170, 172 also allows for coordination of two wireless systems operating in the same space, while still allowing each of the two systems to operate independent of the other. For example, the mobile workers including mobile workers 174, 182 may communicate using a first network with first protocols, and the sensors including sensors 178, 186 shown in FIG. 6B may communicate in a second network using second protocols. The networks, as illustrated above in FIG. 3B, can be coordinated because the infrastructures for each network are managed together.

In the embodiment of FIG. 6B, a communication plan that may include mapping and/or scheduling of transmissions in a first network having the sensors 178, 186 may operate without interfering with a communication plan including mapping and/or scheduling of transmissions for a second network having the mobile workers 174, 182. Other network types may be used in additional embodiments.

FIG. 7 shows another illustrative integrated network environment. In this environment, a first infrastructure node 200 and a second infrastructure node 202 are again equipped with multiple transceivers. The first infrastructure node includes a first antenna 204 and a directional antenna 206, with the directional antenna communicating with sensor 208 using a directional beam. The second infrastructure node 202 communicates using a directional antenna 212 and another antenna 214. Again, the directional antenna 212 is used to communicate with sensors.

The illustrative system of FIG. 7 may make use of the non-directional antennae 204, 214 to communicate with one or more mobile workers 210, 218. As indicated by their name, the workers may be "mobile" and move throughout the available space. Thus, the non-directional antennae 204, 214 may be disposed to provide coverage for a given area/space. Meanwhile, the sensors, including sensor 208, may be at fixed locations. For example, if the sensors are thermostats, smoke alarms or motion detectors, these devices may be placed in a facility at desired locations and left in place. By using directional antennae 206, 212, the amount of noise created by communications with the sensors is reduced to a lesser area than would occur with non-directional antennae. The directional antennae 206, 212 have been shown as phased array antennae, though any suitable directional antennae may be used.

Figure 8:
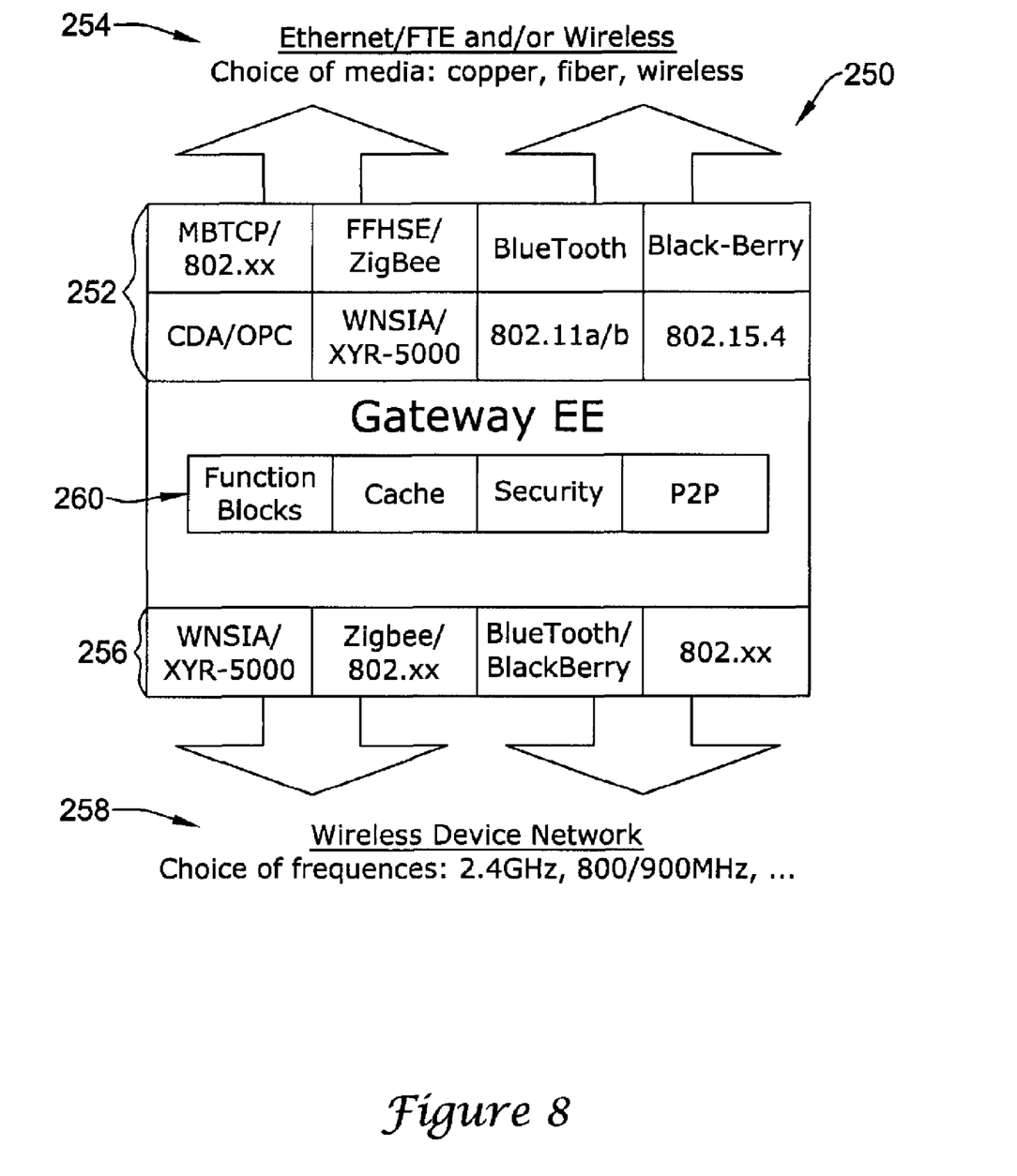
FIG. 8 shows in functional block form an illustrative network integrating device.

FIG. 8 shows in functional block form an illustrative integrating device. The device 250 includes a variety of wired/wireless communication modules shown at 252 that may be used for a first set of communications via suitable media as shown at 254. The device 250 may also include a set of wireless communications shown at 256 that operate on the same device as the wired/wireless communication modules of 252. The wireless communications 256 may occur at suitable frequencies, as nodded at 258. Various components 260 are also shown.

In addition to the above embodiments, further systems, such as third, fourth, or more wireless or wired communication systems may be further incorporated. Certain of the devices in the network may be further adapted to operate with third and more networks.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of communicating between devices in a mesh network using a wireless communication system that includes a first wireless network and a second wireless network, wherein the first wireless network operates in accordance with a first communication protocol and the second wireless network operates in accordance with a second communication protocol, wherein the second communication protocol is not compatible with the first communication protocol, the method comprising:

providing at least two associated infrastructure nodes;

receiving a data signal at a first infrastructure node of the at least two associated infrastructure nodes;

examining the data signal with the first infrastructure node to determine whether the data signal should be directed to the first wireless network, and, if so, routing data from the data signal to a destination node on the first wireless network in accordance with the first communications protocol; if not:

examining the data signal with the first infrastructure node to determine whether the data signal should be directed to the second wireless network and, if so, routing data from the data signal to a destination node on the second wireless network in accordance with the second communications protocol; if not:

examining the data signal with the first infrastructure node to determine whether the data signal should be directed to a second infrastructure node of the at least two associated infrastructure nodes and, if so, routing data from the data signal to the second infrastructure node;

receiving the data signal at the second infrastructure node of the at least two associated infrastructure nodes;

examining the data signal with the second infrastructure node to determine whether the data signal should be directed to the first wireless network, and, if so, routing data from the data signal to a destination node on the first wireless network in accordance with the first communications protocol; if not:

examining the data signal with the second infrastructure node to determine whether the data signal should be directed to the second wireless network and, if so, routing data from the data signal to a destination node on the second wireless network in accordance with the second communications protocol; if not:

examining the data signal with the second infrastructure node to determine whether the data signal should be directed to a third infrastructure node of the at least two associated infrastructure nodes and, if so, routing data from the data signal to the third infrastructure node.

2. The method of claim 1 wherein, if the data signal should be directed to the first or second wireless network, the method further comprises generating a signal acknowledging receipt of the data signal in accordance with the communications protocol for that network.

3. The method of claim 1 wherein:

the at least two infrastructure nodes have a first transceiver and a second transceiver; and the step of receiving a data signal includes operating the first transceiver on a first communication channel and operating the second transceiver on a second communication channel.

4. The method of claim 1 further comprising:

following a first schedule for communication using the first wireless network, the first schedule making use of at least one communication channel and at least one time slot; and communicating on the second wireless network using a communication channel and time slot that does not interfere with the first schedule's use of the at least one communication channel and the at least one time slot.

5. The method of claim 1 wherein each of the at least two infrastructure nodes have a first transceiver and first antenna and a second transceiver and second antenna, wherein at least one antenna is configured for use as a directional antenna, wherein the method further comprises communicating with a first device in either the first wireless network or the second wireless network using a directional antenna, the first device having a fixed location.

6. The method of claim 1 wherein a plurality of fixed location devices communicate using the first wireless network, and at least one mobile device communicates using the second wireless network.

7. The method of claim 1 further comprising:

creating a first communications plan for the first wireless network; and creating a second communications plan for the second wireless network;

wherein the first communications plan and the second communications plan do not interfere with one another.

8. The method of claim 7 wherein the first communications plan is a centrally generated communication plan and the second communications plan is created using a decentralized method.

9. A wireless communications system including a first wireless network and a second wireless network, wherein the first wireless network operates in accordance with a first communication protocol and the second wireless network operates in accordance with a second communication protocol, wherein the second communication protocol is not compatible with the first communication protocol, comprising:

at least two data relaying nodes forming a mesh network; wherein:

the system is configured to communicate with a first communication device that is configured to operate as part of the first wireless network and a second communication device that is configured to operate as part of the second wireless network;

the at least two data relaying nodes are configured to communicate with each of the first communication device and the second communication device;

the at least two data relaying nodes include a first transceiver configured to receive and send data communications; and the system is configured such that:

when a first data relaying node receives a first data communication from the first communication device, the first data relaying node examines the first data communication and determines that the first data communication is from the first wireless network, and treats the first data communication in accordance with the first communication protocol;

when the first data relaying node receives a second data communication from the second communication device, the first data relaying node examines the second data communication and determines that the second data communication is from the second wireless network, and treats the second data communication in accordance with the second communication protocol;

when a first data relaying node receives the first data communication from the first data relaying node, the second data relaying node examines the first data communication and determines that the first data communication is from the first wireless network, and treats the first data communication in accordance with the first communication protocol; and when the second data relaying node receives the second data communication from the second data relaying node, the second data relaying node examines the second data communication and determines that the second data communication is from the second wireless network, and treats the second data communication in accordance with the second communication protocol;

wherein the at least two data relaying nodes are configured such that:

the at least two data relaying nodes use a plurality of communications channels;

the at least two data relaying nodes use a first subset of the plurality of communications channels for communications with the first wireless network;

the at least two data relaying nodes use a second subset of the plurality of communications channels for communications with the second wireless network; and the first subset and the second subset are mutually exclusive of one another.

10. The wireless communication system of claim 9 wherein the system is configured to time-coordinate communications in the first wireless network and the second wireless network.

11. The wireless communication system of claim 10 wherein:
the at least two data relaying nodes include a second transceiver; and
the at least two data relaying nodes are configured to communicate using both a first communication channel via the first transceiver for the first wireless network and a second communication channel via the second transceiver for the second wireless network at the same time.

12. The wireless communication system of claim 11 wherein at least some of the communication devices configured to operate as part of the first wireless network have fixed locations, and wherein the first antenna is capable of providing directional communications, and the at least two data relaying nodes are configured such that, when the at least two data relaying nodes communicate with a communication device in the first wireless network having a fixed location, a directional signal from the first antenna is used.

13. The wireless communication system of claim 9 wherein the first wireless network comprises at least one node having a fixed or predictable location, and the second wireless network comprises at least one mobile node.

14. The wireless communication system of claim 13 wherein the at least two data relaying nodes are configured to use a centralized communications plan with the first wireless network and a decentralized communications plan with the second wireless network.

15. The wireless communication system of claim 9 wherein:
the system is further configured to communicate with a third communication device configured to operate as part of a third network; and
the at least two data relaying nodes are further configured to communicate with the third communication device.

16. The wireless communication system of claim 9 wherein the at least two data relaying nodes are also configured to communicate with a wired communication system.

17. The method of claim 1 wherein the wireless communication system forms part of a building control system that includes two or more wireless sensors.

18. The wireless communication system of claim 9 wherein the wireless communication system forms part of a building control system that includes two or more wireless sensors.

19. The method of claim 1 wherein the at least two associated infrastructure nodes form a mesh network.

* * * * *